United States Patent

Lu et al.

(10) Patent No.: US 12,084,075 B2
(45) Date of Patent: Sep. 10, 2024

(54) METHODS AND SYSTEMS FOR ADAPTIVE BLENDING OF DRIVER AND AUTOMATED STEERING COMMANDS UNDER EXTERNAL THREAT

(71) Applicant: GM GLOBAL TECHNOLOGY OPERATIONS LLC, Detroit, MI (US)

(72) Inventors: Jimmy Lu, Markham (CA); Reza Zarringhalam, Whitby (CA); Kin Man Michael Wong, Thornhill (CA); Jackson Barry McGrory, Mississauga (CA); Mehdi Abroshan, Waterloo (CA); Puneet Bagga, Etobicoke (CA); Zhi Li, Unionville (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 425 days.

(21) Appl. No.: 17/457,224

(22) Filed: Dec. 1, 2021

(65) Prior Publication Data

US 2023/0174086 A1   Jun. 8, 2023

(51) Int. Cl.
*B60W 50/10* (2012.01)
*B60W 60/00* (2020.01)
*G01L 3/10* (2006.01)

(52) U.S. Cl.
CPC ........ *B60W 50/10* (2013.01); *B60W 60/0055* (2020.02); *G01L 3/10* (2013.01); *B60W 2540/18* (2013.01); *B60W 2554/801* (2020.02)

(58) Field of Classification Search
None
See application file for complete search history.

(56) References Cited

U.S. PATENT DOCUMENTS

| | | | |
|---|---|---|---|
| 2015/0158528 A1* | 6/2015 | Moshchuk | B62D 15/0265 701/41 |
| 2017/0158227 A1* | 6/2017 | Katzourakis | B62D 6/008 |
| 2017/0227959 A1* | 8/2017 | Lauffer | B60W 60/0055 |
| 2020/0130723 A1* | 4/2020 | Cao | B62D 1/183 |
| 2020/0255007 A1* | 8/2020 | Tsuji | B60W 50/16 |

* cited by examiner

*Primary Examiner* — James J Lee
*Assistant Examiner* — Tawri M McAndrews
(74) *Attorney, Agent, or Firm* — Lorenz & Kopf LLP

(57) ABSTRACT

In accordance with an exemplary embodiment, methods and systems are provided for controlling steering of an autonomous vehicle. The method includes: operating, by a processor, the autonomous vehicle in a semi-automated mode; receiving, by the processor, driver input including a measured driver torque; receiving, by the processor, threat data; determining, by the processor, a steering command bias based on an impedance relation, impedance parameters, the measured driver torque, and the threat data; determining, by the processor, a reference angle based on the steering command bias and a desired angle; and generating, by the processor, control data to control the steering of the autonomous vehicle based on the reference angle.

8 Claims, 4 Drawing Sheets

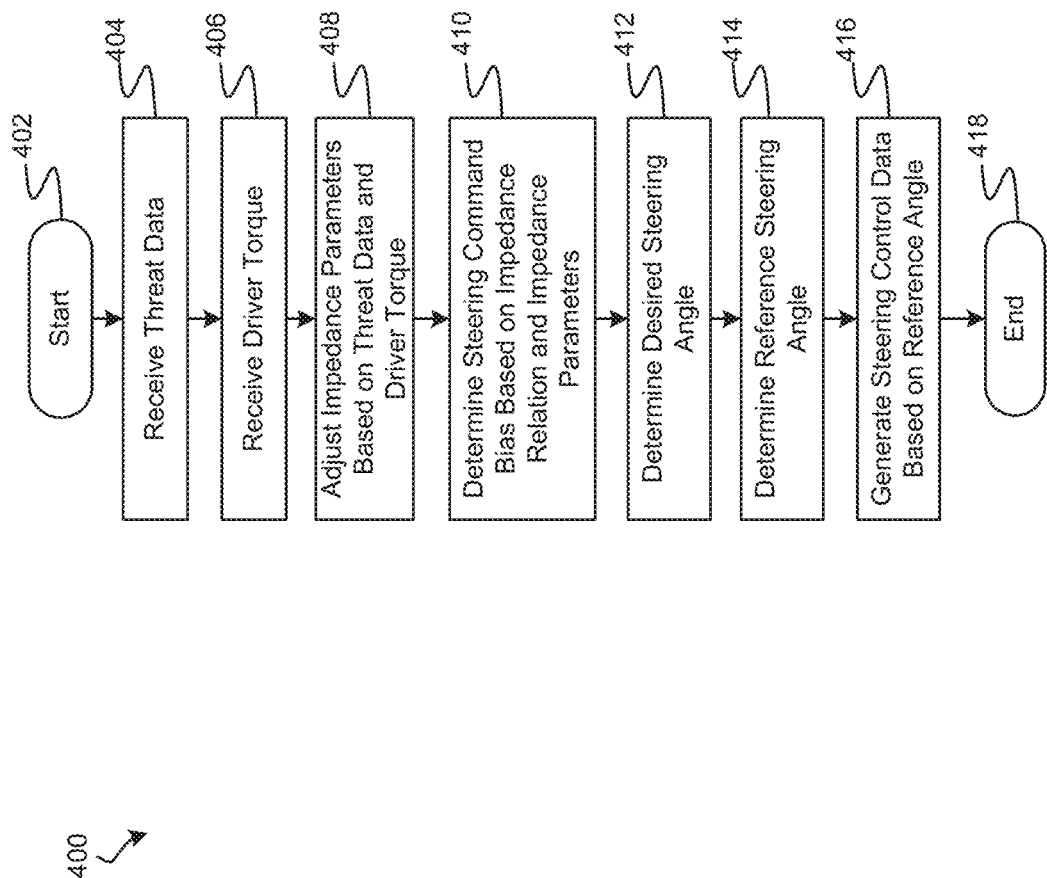

METHODS AND SYSTEMS FOR ADAPTIVE BLENDING OF DRIVER AND AUTOMATED STEERING COMMANDS UNDER EXTERNAL THREAT

TECHNICAL FIELD

The technical field generally relates to vehicles and, more specifically, to methods and systems for providing semi-autonomous steering of a vehicle when an external threat is detected.

Path-based automated driving assist features function to achieve automated lane keeping and/or lane following through steering control. Semi-autonomous steering achieves automated lane following by asserting control on the steering wheel, while the driver occasionally inputs steering torque that may counter the automated control actions.

In order to achieve a smooth blending of the driver steering torque while the automated lane following is in control and maximize controller engagement, an impedance controller may be used to modify the steering command. In some instances, an external threat to the vehicle may cause a driver to various input torque to the steering. Strategies to modify the impedance controller when an external threat is detected is desirable to make the overall feature safer and more natural for the various input torque.

Accordingly, it is desirable to provide methods and systems for providing semi-autonomous steering control when an external threat is present. Furthermore, other desirable features and characteristics of the present invention will become apparent from the subsequent detailed description and the appended claims, taken in conjunction with the accompanying drawings and the foregoing technical field and background.

SUMMARY

In accordance with an exemplary embodiment, methods and systems are provided for controlling steering of an autonomous vehicle. The method includes: operating, by a processor, the autonomous vehicle in a semi-automated mode; receiving, by the processor, driver input including a measured driver torque; receiving, by the processor, threat data; determining, by the processor, a steering command bias based on an impedance relation, impedance parameters, the measured driver torque, and the threat data; determining, by the processor, a reference angle based on the steering command bias and a desired angle; and generating, by the processor, control data to control the steering of the autonomous vehicle based on the reference angle.

In various embodiments, the method includes adjusting the impedance parameters based on the threat data, and wherein the determining the steering command bias is based on the adjusted impedance parameters.

In various embodiments, the threat data includes at least one of a lateral distance to a threat, a time to impact, and a threat type.

In various embodiments, the adjusting comprises increasing the impedance stiffness parameter in a nonlinear manner as a function of the threat data.

In various embodiments, the threat data includes a direction of a threat, and wherein the adjusting the impedance parameters is based on the direction of the threat and the steering command bias.

In various embodiments, the adjusting comprises blending the impedance parameters continuously over a time period.

In various embodiments, the blending is based on a first time period when a threat appears in the same direction as the current steering command bias.

In various embodiments, the blending occurs over a second time period when the threat is no longer present.

In various embodiments, the second time period is longer than the first time period.

In various embodiments, the method further includes allowing driver input to directly steer the vehicle without semi-autonomous steering when the measured driver torque is greater than a dynamic threshold.

In another embodiments, a system includes a non-transitory computer readable medium comprising computer instructions configured to perform a process; and a processor, configured to perform the process. The process includes: operating, by the processor, the autonomous vehicle in a semi-automated mode; receiving, by the processor, driver input including a measured driver torque; receiving, by the processor, threat data; determining, by the processor, a steering command bias based on an impedance relation, impedance parameters, the measured driver torque, and the threat data; determining, by the processor, a reference angle based on the steering command bias and a desired angle; and generating, by the processor, control data to control the steering of the autonomous vehicle based on the reference angle.

In various embodiments, the process includes adjusting the impedance parameters based on the threat data and wherein the determining the steering command bias is based on the adjusted impedance parameters.

In various embodiments, the threat data includes at least one of a lateral distance to a threat, a time to impact, and a threat type.

In various embodiments, the adjusting comprises increasing the impedance stiffness parameter in a nonlinear manner as a function of the threat data.

In various embodiments, the threat data includes a direction of a threat, and wherein the adjusting the impedance parameters is based on the direction of the threat and the steering command bias.

In various embodiments, the adjusting comprises blending the impedance parameters continuously over a time period.

In various embodiments, the blending is based on a first time period when a threat appears in the same direction as the current steering command bias.

In various embodiments, the blending occurs over a second time period when the threat is no longer present.

In various embodiments, the second time period is longer than the first time period.

In various embodiments, the process further includes allowing driver input to directly steer the vehicle without semi-autonomous steering when the measured driver torque is greater than a dynamic threshold.

DESCRIPTION OF THE DRAWINGS

The present disclosure will hereinafter be described in conjunction with the following drawing figures, wherein like numerals denote like elements, and wherein:

FIG. 4 is a flowchart of a process for controlling steering of the autonomous vehicle, in accordance with exemplary embodiments.

DETAILED DESCRIPTION

The following detailed description is merely exemplary in nature and is not intended to limit the disclosure or the application and uses thereof. Furthermore, there is no intention to be bound by any theory presented in the preceding background or the following detailed description. Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
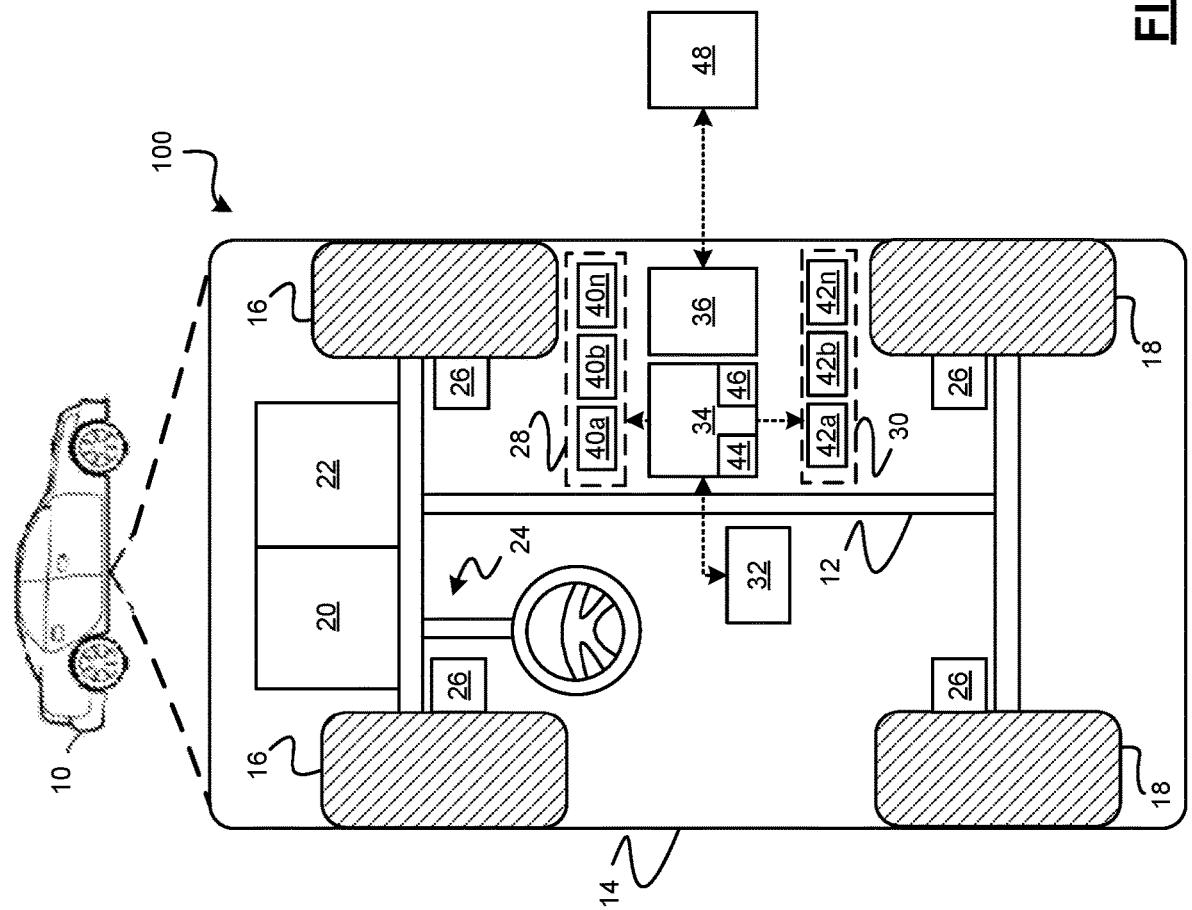
FIG. 1 is a functional block diagram of an autonomous vehicle that includes a steering control system, in accordance with exemplary embodiments.

With reference to FIG. 1, a steering control system shown generally at 100 is associated with a vehicle 10 in accordance with various embodiments. In general, the steering control system 100 alters the driver steering feel and reduces the steering authority of semi-autonomous lane centering control in nominal conditions or when a side threat is present (e.g., when a vehicle is in a neighboring lane, cyclist or static traffic object are present to the side). In various embodiments, the steering control system 100 provides for adapting driver feel and reduction in automated control authority to ensure a smooth blending of driver torque with automated steering while maintaining adequate safety distances from the threat.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the driver override system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Two or Three level of automation. As can be appreciated, in various embodiments, the autonomous vehicle 10 can be any level of automation.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. In various embodiments, the sensing devices 40a-40n include one or more image sensors that generate image sensor data that is used by the system 100.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
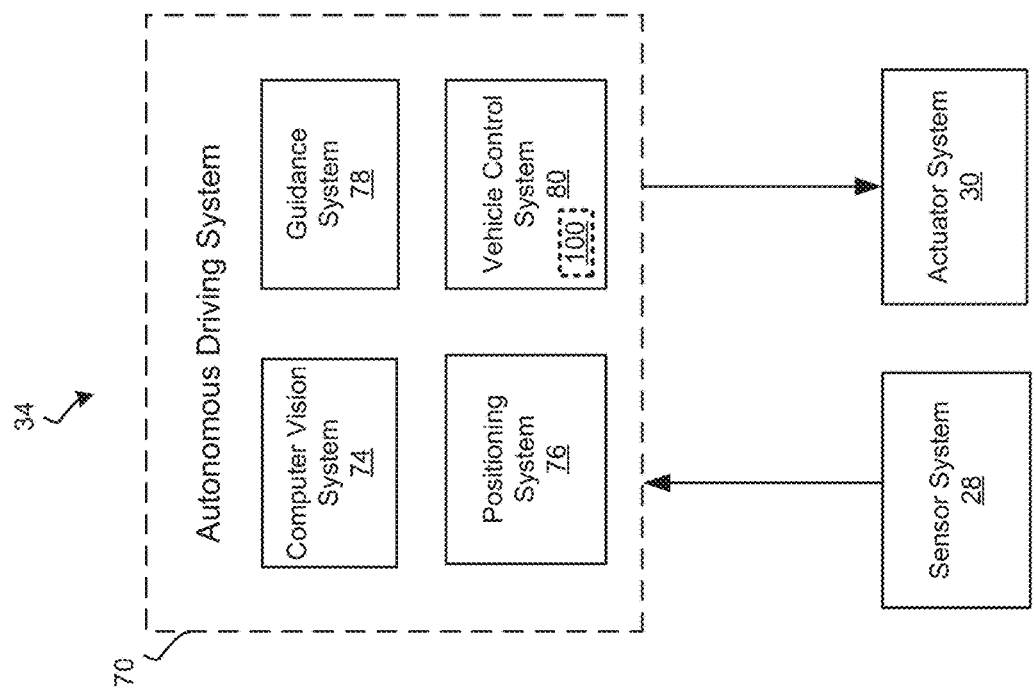
FIG. 2 is a functional block diagram of an autonomous driving system of the autonomous vehicle that includes the steering control system, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. In various embodiments, the defined maps include height maps of the environment that are used by the system 100. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the steering control system 100 and, when executed by the processor 44, process data from the sensors and/or data from within the controller 34 to control steering of the vehicle 10 in accordance with the exemplary embodiments disclosed herein.

In accordance with various embodiments, the controller 34 implements an autonomous driving system (ADS) 70 as shown in FIG. 2. That is, suitable software and/or hardware components of the controller 34 (e.g., the processor 44 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 2, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, all or parts of the steering control system 100 of FIG. 1 is included within the ADS 70, for example, as part of the vehicle control system 80. For example, the steering control system 100 generates steering command data for controlling a steering angle of the steering system 24 of FIG. 1.

Figure 3:
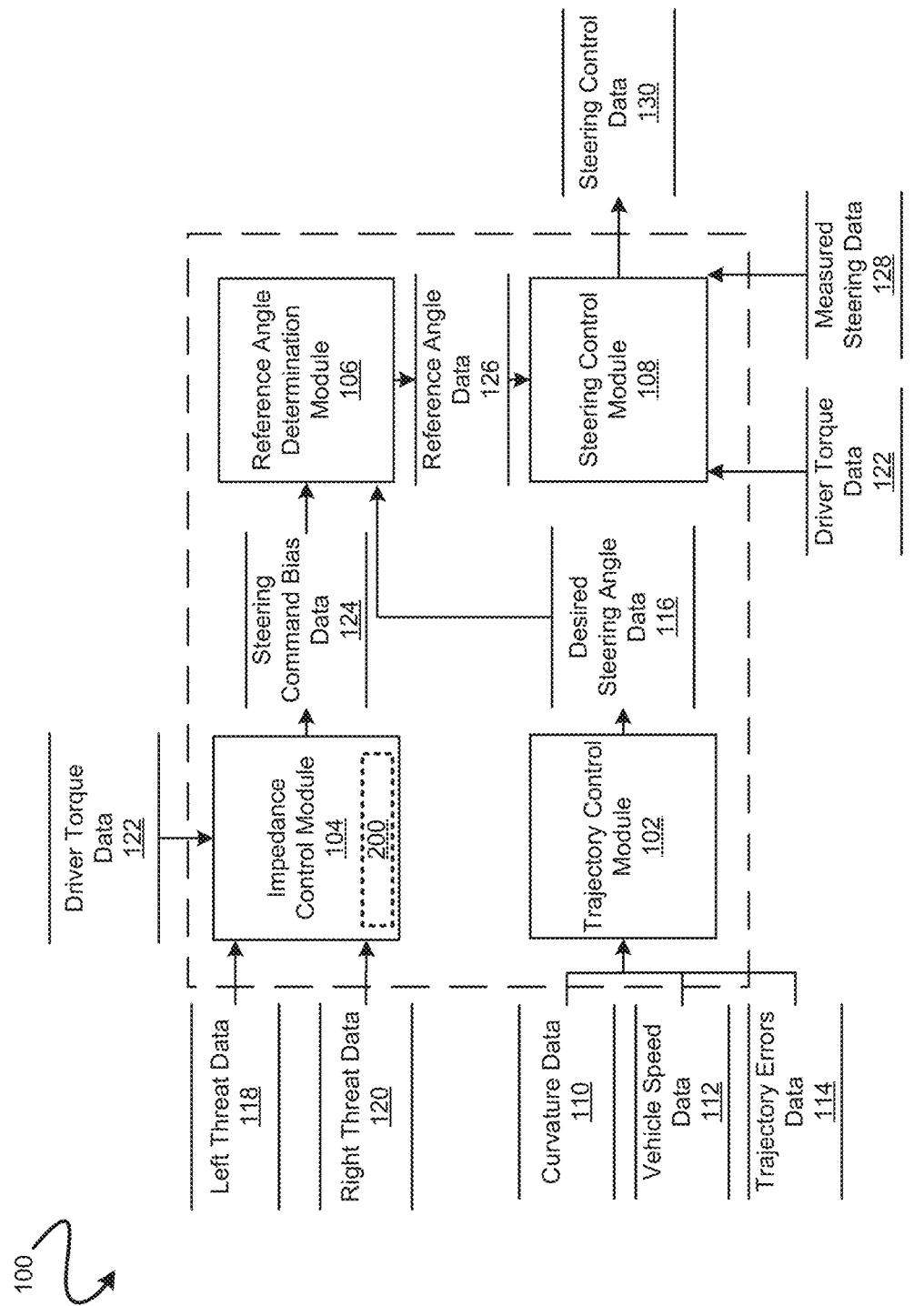
FIG. 3 is a dataflow diagram illustrating a steering control system, in accordance with exemplary embodiments.

For example, as shown in more detail with regard to FIG. 3 and with continued reference to FIGS. 1 and 2, the steering control system 100 includes a trajectory control module 102, an impedance control module 104, a reference angle determination module 106, and a steering control module 108. As can be appreciated, the modules shown may be combined and/or further partitioned in various embodiments.

The trajectory control module 102 receives as input road curvature data 110, vehicle speed data 112, and trajectory errors data 114. Based on the inputs, the trajectory control module determines a desired steering angle $\theta_d$ for controlling a trajectory of the vehicle along a path and generates desired steering angle data 116 based thereon.

The impedance control module 104 receives as input left threat data 118, right threat data 120, and driver torque data 122. In various embodiments, the left threat data 118 indicates a threat is detected on the left lateral side of the vehicle 10, an estimated time to impact of the left threat, and a threat type. Similarly, the right threat data 120 indicates a threat is detected on the right lateral side of the vehicle 10, an estimated time to impact of the right threat, and a threat type. The driver torque data 122 indicates a sensed amount of driver provided torque on the steering system 24. Based on the inputs, the impedance control module 104 determines a steering command bias $\Delta\theta$ as an impedance relation forced by the measured driver steering torque, $\tau_d = M\Delta\ddot{\theta} + B\Delta\dot{\theta} +$ KΔθ, where M, B and K are impedance parameters: mass, damping, and stiffness, respectively. The impedance control module 104 generates steering command bias data 124 based on the determined steering bias Δθ.

In various embodiments, the impedance control module includes a parameters adaption sub-module 200 that modifies one or more of the impedance parameters (M, B, and K) based on the detected side threat. In various embodiments, the parameters are adjusted to make steering into the side of the threat more difficult, which creates a steer-back steering (e.g., steering back to a center or other position) when the vehicle 10 is biased in a lane and a threat is detected on that side.

In various embodiments, the parameters are adjusted using the lateral distance to threat, the threat time to impact, and/or the threat type. For example, the parameters adjustment module 200 increases the impedance stiffness when the steering command bias Δθ generated by the impedance control module 104 is in the same direction of the threat detected. In various embodiments, the other impedance parameters are changed in tandem to achieve the required steering-effort-to-position-bias, while maintaining adequate damping ratio (e.g., $>=0.5$) and a natural frequency low enough to reject driver torque sensor noise and high enough to ensure the bandwidth is above human actuation bandwidth (e.g., $>=2$ Hz).

In another example, the parameters adjustment module 200 adjusts the steering-effort-to-position-bias nonlinearly to a high plateau, thereby achieving a barrier effect, when the threat time to impact decreases toward a predefined threshold. One such implementation, is a paraboloid mapping for impedance stiffness, which increases to a constant high value as distance to threshold and/or time to impact decreases toward zero, and blends to a constant low value as they increase toward infinity.

In another example, the parameters adjustment module 200 linearly blends the impedance parameters when the detected threat is between a relevant threat condition and a nominal condition as indicated by the threat type. The parameters adjustment module 200 blends the parameters over a time period. In various embodiments, the blend time period is short when switching from nominal condition to a relevant threat to achieve a steer-back effect, while the blend time period is long when switching from a relevant threat to a nominal threat to achieve deadbeat steering. In various embodiments, the threat can be classified based on the time to impact, an obstacle type or mass ratio associated therewith, and/or the moving direction of the threat.

The reference angle determination module 106 receives as input the desired steering angle data 116, and the steering command bias data 124. Based on the inputs, the reference angle determination module 106 determines a reference angle $\theta_r$ for controlling the steering of the vehicle 10 and generates reference angle data 126 based thereon. For example, the reference angle determination module 106 adds the steering command bias Δθ and the desired steering angle $\theta_d$ to determine the steering angle reference as $\theta_r = \theta_d + \Delta\theta$.

The steering control module 108 receives as input the reference angle data 126 and measured steering angle data 128. The measured steering angle data 128 indicates a measured steering angle of the steering system 24 of the vehicle 10. The steering control module 108 generates steering control data 130 to control the measured steering angle of the steering system 24 to or within range of the reference angle thereby controlling the steering of the vehicle based on a blend of driver torque and autonomous control when a threat is detected.

In various embodiments, the steering control module 108 generates the steering control data 130 based on the driver torque data 132 and without considering the reference angle data 126 when a driver torque override threshold has been reached. The driver torque threshold can be determined as a function of whether the impedance control is active, a lateral position of the vehicle, a path curvature, a threat classification, sensor faults, map faults, and any lane data faults and vehicle speed. When the driver torque is less than the override threshold, the driver has the capability to offset the vehicle relative to the target trajectory due to the impedance control; when the driver torque is more than the override threshold, the driver has full control to maneuver the vehicle. This creates a two-tiered steering feel.

With reference now to FIG. 4, a flowchart illustrates a process 400 for controlling the steering, in accordance with exemplary embodiments. The process 400 can be implemented in connection with the vehicle 10 of FIG. 1, the ADS 70 of FIG. 2, and the steering control system 100 of FIG. 3 in accordance with exemplary embodiments. As can be appreciated in light of the disclosure, the order of operation within the process 400 is not limited to the sequential execution as illustrated in FIG. 4, but may be performed in one or more varying orders as applicable and in accordance with the present disclosure. In various embodiments, the process 400 can be scheduled to run based on one or more predetermined events, and/or can run continuously during operation of the vehicle 10.

As depicted in FIG. 4, the process 400 may begin at 402. The left threat data 118 and the right threat data 120 are received at 404. The driver torque data 122 is received at 406. The impedance parameters are adjusted based on the left threat data 118, the right threat data 120, and the driver torque data 122, for example, as discussed above. The steering command bias is determined based on the impedance relation and impedance parameters at 410, for example, as discussed above. The desired steering angle is determined at 412 based on, for example, the vehicles speed and road features. The reference angle is determined based on the steering command bias and the desired steering angle at 414; and steering control data is generated based on the reference angle at 416. Thereafter, the process 400 may end at 418.

Accordingly, methods, systems, and vehicles are provided for controlling steering of a semi-autonomous vehicle when a threat is detected. It will be appreciated that the systems, vehicles, and methods may vary from those depicted in the Figures and described herein. For example, the vehicle 10 of FIG. 1, and the system 100 of FIG. 3 and components thereof, may vary in different embodiments. It will similarly be appreciated that the steps of the process 400 may differ from those depicted in FIG. 4, and/or that various steps of the process 400 may occur concurrently and/or in a different order than that depicted in FIG. 4.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling steering of an autonomous vehicle, comprising:
    operating, by a processor, the autonomous vehicle in a semi-automated mode;
    receiving, by the processor, driver input including a measured driver torque;
    determining, by the processor, a steering command bias based on an impedance relation, impedance parameters, and the measured driver torque, wherein the impedance relation comprises $\tau_d = M\Delta\ddot{\theta} + B\Delta\dot{\theta} + K\Delta\theta$, where $\tau_d$ represents the measured driver torque, $\Delta\theta$ represents the steering command bias, and M, B, and K comprise the impedance parameters of mass, damping, and stiffness, respectively;
    determining, by the processor, a reference angle based on the steering command bias and a desired angle, wherein determining the reference angle comprises adding the steering command bias to the desired angle to determine the reference angle $\theta_r = \theta_d + \Delta\theta$, where $\theta_d$ represents the desired angle for controlling a trajectory of the autonomous vehicle along a path output by a trajectory control module;
    generating, by the processor, control data to control the steering of the autonomous vehicle based on the reference angle;
    in response to receiving, by the processor, threat data including a direction of a threat, adjusting the impedance parameters to increase an impedance stiffness parameter in the direction of the threat based on the direction of the threat over a first time period, wherein the determining the steering command bias is based on the adjusted impedance parameters; and
    when the threat is no longer present, adjusting the impedance parameters over a second time period, wherein the second time period is longer than the first time period.

2. The method of claim 1, wherein the adjusting comprises increasing the impedance stiffness parameter in a nonlinear manner as a function of the threat data.

3. The method of claim 1, wherein the adjusting comprises blending the impedance parameters continuously over the first time period.

4. The method of claim 1, further comprising allowing driver input to directly steer the vehicle without semi-autonomous steering when the measured driver torque is greater than a dynamic threshold.

5. A system for controlling steering of an autonomous vehicle, comprising:
    a non-transitory computer readable medium comprising computer instructions configured to perform a process; and a processor, configured to perform the process, the process comprising:
    operating, by the processor, the autonomous vehicle in a semi-automated mode;
    receiving, by the processor, driver input including a measured driver torque;
    determining, by the processor, a steering command bias based on an impedance relation, impedance parameters, and the measured driver torque, wherein the impedance relation comprises $\tau_d = M\Delta\ddot{\theta} + B\Delta\dot{\theta} + K\Delta\theta$, where $\tau_d$ represents the measured driver torque, $\Delta\theta$ represents the steering command bias, and M, B, and K comprise the impedance parameters of mass, damping, and stiffness, respectively;
    determining, by the processor, a reference angle based on the steering command bias and a desired angle, wherein determining the reference angle comprises adding the steering command bias to the desired angle to determine the reference angle $\theta_r = \theta_d + \Delta\theta$, where $\theta_d$ represents the desired angle for controlling a trajectory of the autonomous vehicle along a path output by a trajectory control module;
    generating, by the processor, control data to control the steering of the autonomous vehicle based on the reference angle;
    in response to receiving, by the processor, threat data including a direction of a threat, adjusting the impedance parameters to increase an impedance stiffness parameter in the direction of the threat based on the direction of the threat over a first time period, wherein the determining the steering command bias is based on the adjusted impedance parameters; and
    when the threat is no longer present, adjusting the impedance parameters over a second time period, wherein the second time period is longer than the first time period.

6. The system of claim 5, wherein the adjusting comprises increasing the impedance stiffness parameter in a nonlinear manner as a function of the threat data.

7. The system of claim 5, wherein the adjusting comprises blending the impedance parameters continuously over the first time period.

8. The system of claim 5, further comprising allowing driver input to directly steer the vehicle without semi-autonomous steering when the measured driver torque is greater than a dynamic threshold.

* * * * *